United States Patent
Steiner et al.

(10) Patent No.: US 7,654,238 B2
(45) Date of Patent: Feb. 2, 2010

(54) SYSTEMS AND METHODS FOR CONTROLLED SHUTDOWN AND DIRECT START FOR INTERNAL COMBUSTION ENGINE

(75) Inventors: Bernd Steiner, Berglsch-Gladbach (DE); Ulrich Kramer, Berglsch-Gladbach (DE); Klemens Greiser, Langenfeld (DE); Patrick Phlips, Cologne (DE); Harald Stoffels, Cologne (DE); Torsten Sude, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 729 days.

(21) Appl. No.: 11/163,975

(22) Filed: Nov. 4, 2005

(65) Prior Publication Data

US 2006/0102138 A1    May 18, 2006

(30) Foreign Application Priority Data

| Nov. 8, 2004 | (EP) | ................................. 04105590 |
| Nov. 16, 2004 | (EP) | ................................. 04105804 |
| Dec. 14, 2004 | (EP) | ................................. 04106558 |
| Dec. 20, 2004 | (EP) | ................................. 04106733 |

(51) Int. Cl.
*F02N 17/00* (2006.01)
*F16F 15/14* (2006.01)

(52) U.S. Cl. ................. 123/179.1; 123/192.1; 74/572.2

(58) Field of Classification Search .............. 123/179.1, 123/1 R, 197.4, 198 R, 192.1; 74/572.1, 74/572.2

See application file for complete search history.

(56) References Cited

U.S. PATENT DOCUMENTS

| 3,762,387 | A | * | 10/1973 | Blomberg et al. | ......... 123/179.1 |
| 3,886,810 | A | * | 6/1975 | Sugiyama et al. | ............. 477/41 |
| 4,252,208 | A | * | 2/1981 | Heidemeyer et al. | ........ 180/165 |
| 4,411,171 | A | * | 10/1983 | Fiala | ............................. 475/5 |
| 4,519,485 | A | * | 5/1985 | Greenwood | .................... 477/2 |
| 4,928,553 | A | * | 5/1990 | Wagner | ...................... 475/268 |
| 5,086,664 | A | * | 2/1992 | Wagner | ..................... 74/572.1 |

(Continued)

FOREIGN PATENT DOCUMENTS

DE         4227339  A1      2/1994

(Continued)

OTHER PUBLICATIONS

Patent Abstracts of Jaoan; Pub No. 06-229357; Takahasi Takashi; Oct. 16, 1994.*

(Continued)

*Primary Examiner*—Noah Kamen
(74) *Attorney, Agent, or Firm*—Allan Lippa; Brooks Kushman P.C.

(57) ABSTRACT

Systems and methods for controlling shut down of a multiple cylinder internal combustion engine include a mechanical energy storage device to decelerate an engine crankshaft to a stopping position desirable for restarting of the engine. Energy stored during shut down may be used to adjust or reposition the crankshaft to one of a plurality of angular orientations advantageous for restarting, and/or used to rotate the crankshaft during restarting of the engine. A flywheel having a variable mass, such as provided by two or more segments, which may be fixedly or selectively coupled to one or more springs may be used to selectively store and release energy.

13 Claims, 13 Drawing Sheets

U.S. PATENT DOCUMENTS

| | | | |
|---|---|---|---|
| 5,447,143 | A | 9/1995 | Ott et al. |
| 5,687,682 | A * | 11/1997 | Rembold et al. ......... 123/179.3 |
| 6,195,985 | B1 | 3/2001 | Del Re et al. |
| 6,386,169 | B1 * | 5/2002 | Gracyalny et al. ..... 123/185.14 |
| 6,453,863 | B1 * | 9/2002 | Pels et al. ................ 123/179.3 |
| 6,602,140 | B2 * | 8/2003 | Jee .......................... 464/68.92 |
| 6,668,995 | B2 * | 12/2003 | Janson et al. ............. 192/55.4 |
| 6,752,112 | B1 * | 6/2004 | Ohata et al. ............. 123/179.4 |
| 6,778,899 | B2 * | 8/2004 | Weimer et al. .............. 701/115 |
| 6,915,720 | B2 * | 7/2005 | Yamazaki ............... 74/572.21 |
| 7,044,022 | B2 * | 5/2006 | Kim .......................... 74/574.2 |
| 2004/0159297 | A1 | 8/2004 | Kataoka et al. |

FOREIGN PATENT DOCUMENTS

| | | |
|---|---|---|
| DE | 10123037 A1 | 11/2002 |
| EP | 1422420 | 5/2004 |
| EP | 1439295 | 7/2004 |
| FR | 2267897 A | 11/1975 |
| FR | 2824873 A | 11/2002 |
| GB | 676850 A | 8/1952 |
| GB | 2313154 A | 11/1997 |
| JP | 06-229357 * | 8/1994 |
| RU | 808679 A1 | 2/1994 |
| SE | 8801384 L | 10/1989 |
| WO | WO 01/48373 A | 3/1993 |
| WO | WO 93/04278 A | 3/1993 |
| WO | WO 98/57062 A | 12/1998 |
| WO | WO 03/012273 A * | 2/2003 |
| WO | WO 03/019002 A | 3/2003 |

OTHER PUBLICATIONS

EPO Search Report, App. No. 04105804.1, May 3, 2005.
Patent Abstracts of Japan; Pub. No. 08261291; Yamaha Motor Co. Ltd; Oct. 8, 1996.
EPO Search Report, App. No. 04105590.6, Jul. 5, 2005.
EPO Search Report, App. No. 04106558.2, Feb. 4, 2005.
EPO Search Report, App. No. 04106733.1, Feb. 15, 2005.
U.S. Appl. No. 11/164,017; "Engine Shut Down Using Fluid Pump To Control Crankshaft Stopping Position"; filed Nov. 7, 2005.
U.S. Appl. No. 11/164,047; "System and Method For Controlling Crankshaft Position During Engine Shutdown Using Cylinder Pressure"; filed Nov. 8, 2005.

* cited by examiner

SYSTEMS AND METHODS FOR CONTROLLED SHUTDOWN AND DIRECT START FOR INTERNAL COMBUSTION ENGINE

CROSS REFERENCE TO RELATED APPLICATIONS

This application claims priority under 35 USC §119 to European Patent Application Nos.: 004106558.2, filed Dec. 14, 2004; 04105804.1 filed Nov. 16, 2004; 04105590.6 filed Nov. 8, 2004; and 04106733.1 filed Dec. 20, 2004.

BACKGROUND OF THE INVENTION

1. Field of the Invention

The present invention relates to systems and methods for controlled shutdown and direct starting of an internal combustion engine.

2. Background Art

One concept for improving fuel consumption of a vehicle is to shut down the internal combustion engine if there is no requirement for power instead of allowing it to continue to idle. One application is stop and go traffic that may occur in traffic jams on freeways as well as at traffic lights, railroad crossings, etc.

One problem with the concepts that shut down the internal combustion engine when it is not required in order to improve fuel consumption is the necessity to start the internal combustion engine again. Restarting causes problems because when the internal combustion engine is shut down in an uncontrolled way, the crankshaft and the camshaft stop in an unknown random position. Consequently, the position of the pistons in the individual cylinders of the internal combustion engine is also unknown and is left to chance. Accurate crankshaft position information is, however, useful for restarting the engine in an uncomplicated manner that is as fast and efficient as possible and thus saves fuel. For example, in engines with direct injection, it is possible to start or restart the engine directly from the stationary state without a starter motor by injecting fuel directly into the combustion chambers and igniting the fuel/air mixture using a spark plug. To be carried out successfully, it is advantageous if the crankshaft is at or near a specific position at the commencement of the starting so that at least one piston is in a position where a fuel injection and subsequent ignition of the air/fuel mixture lead to movement of the piston within the cylinder. In a four-stroke internal combustion engine, the piston would have to be in the expansion or working stroke with at least one associated exhaust valve closed. This may be, for example, in a position of approximately 90° crank angle after top dead center (TDC). As such, this method for direct starting or restarting requires an accurate indication of the crankshaft position or piston position to select appropriate cylinders for the fuel injection to start the engine.

In an internal combustion engine which is equipped with an electronically regulated ignition and/or an electronically regulated injection, markers which are arranged on the crankshaft supply signals about the crankshaft position to sensors which are connected to the engine control system to control the ignition time and the injection time. However, these sensors require rotation of the crankshaft to provide a signal and provide ambiguous information for a number of cylinder firings immediately after starting or restarting the engine so that some time is required to synchronize the crank angle position and the engine control parameters. In addition, devices have to be provided for starting or restarting the internal combustion engine, such as a conventional starter motor, electric motor, or a similar device suitable for rotating the crankshaft.

Various concepts have been proposed in the prior art for controlling the stopping position of the crankshaft (or adjusting the position after the engine is stopped) and for restarting the engine. These concepts may generally be categorized as either active or passive. The active adjustment devices either require additional components, such as an additional electric motor, to apply an adjustment torque, or operate using an additional fuel injection or ignition in the same way as when selective combustion processes are initiated in order to set the predefined crank angle position. Concepts that employ active devices that require additional fuel or electrical energy are contrary to the basic goal of shutting down the engine to save fuel or energy to improve fuel economy.

Passive adjustment devices may use the rotational movement of the crankshaft during shut down after fuel and/or ignition have ended to control the stopping position of the crankshaft in a predefined advantageous position. For example, an intake/exhaust (gas exchange) valve control system may be used as a passive adjustment device to exert a stopping or braking force on the engine or crankshaft to control the deceleration of the shaft and its stopping position. However, many of the disclosed concepts are not suitable for controlling the stopping position of the crankshaft with the necessary accuracy to facilitate direct restart.

SUMMARY OF THE INVENTION

Systems and methods for controlling shut down of a multiple cylinder internal combustion engine include a mechanical energy storage device to decelerate an engine crankshaft to a stopping position desirable for restarting of the engine. Energy stored during shut down may be used to adjust or reposition the crankshaft to one of a plurality of angular orientations advantageous for restarting, and/or used to rotate the crankshaft during restarting of the engine.

Embodiments of the invention include a flywheel having a variable mass with the mass controlled during engine shutdown to transfer kinetic energy from the rotating crankshaft and connected drive train components to the flywheel to control crankshaft stopping position. If needed, energy from the flywheel is subsequently used to adjust position of the crankshaft and/or to rotate the crankshaft during restarting of the engine. In one embodiment a flywheel having two or more segments with at least one segment selectively coupleable directly or indirectly to the crankshaft is used to vary the flywheel mass. One or more springs may be disposed in fixed relationship between flywheel segments to store energy during shutdown and to subsequently release energy to adjust crankshaft position and/or restart the engine. Alternatively, one or more springs may be selectively engaged or coupled in various combinations between a fixed, non-rotating engine component, one or more flywheel segments, and the engine crankshaft to selectively store and release energy to decelerate and accelerate, respectively, the engine crankshaft. One or more springs may also be used in combination with a locking or blocking device to control crankshaft stopping position on shutdown.

The present invention provides a number of advantages. For example, the present invention provides an internal combustion engine with a controlled shut down to position the crankshaft in a stopped position that is advantageous for restarting. Locating the crankshaft in a preferred position during shut down provides clarity or certainty about the correct injection time and ignition time at the beginning of the restarting process so that a run-in phase is not necessary to synchronize the engine operating parameters. The invention provides a low energy consumption system and method for stopping, adjusting, and/or restarting the engine.

The above advantages and other advantages and features of the present invention will be readily apparent from the following detailed description of the preferred embodiments when taken in connection with the accompanying drawings.

DETAILED DESCRIPTION OF THE PREFERRED EMBODIMENT(S)

As those of ordinary skill in the art will understand, various features of the present invention as illustrated and described with reference to any one of the Figures may be combined with features illustrated in one or more other Figures to produce embodiments of the present invention that are not explicitly illustrated or described. The combinations of features illustrated provide representative embodiments for typical applications. However, various combinations and modifications of the features consistent with the teachings of the present invention may be desired for particular applications or implementations.

Figure 1:
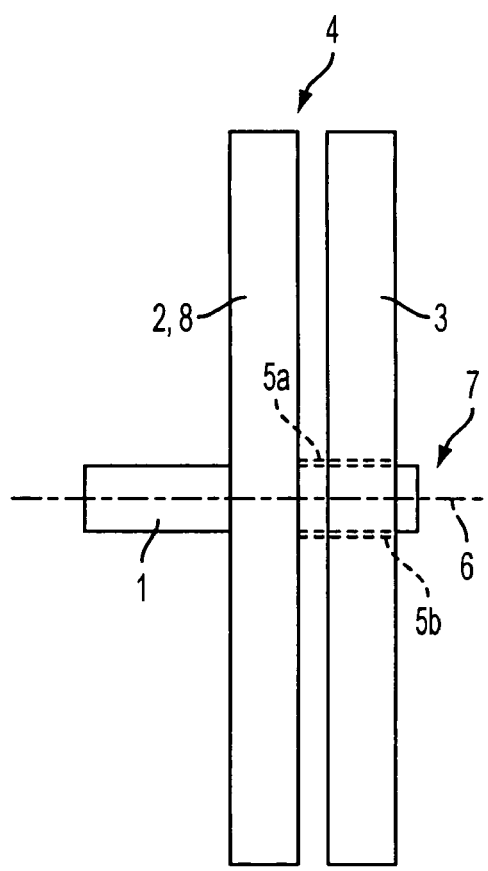
FIG. 1 is a schematic view of a crankshaft and flywheel for controlled stopping of a crankshaft and restarting of an engine according to one embodiment of the present invention.

FIG. 1 is a schematic view of a crankshaft 1 and a flywheel 4 of a first embodiment of an internal combustion engine. Flywheel 4 is constructed in a modular fashion from two flywheel segments 2, 3, with the two flywheel segments 2, 3 being embodied in the form of flywheel disks 2, 3 which can be connected to one another and detached from one another. The first flywheel segment 2 is secured to the crankshaft 1 and serves as a base segment 8. In one embodiment represented in FIGS. 1 and 2, the flywheel mass can be selectively varied between a minimum flywheel mass, which is determined by the mass of the base segment 8, and a maximum flywheel mass corresponding to the sum of the two flywheel disks 2, 3.

The flywheel mass has a significant influence on the coasting process of the crankshaft, i.e. on the rotational movement of crankshaft 1 after the internal combustion engine has been shut down, and thus on the stopping or end position of crankshaft 1. After the ignition and/or the fuel supply have been switched off, the rotational movement of crankshaft 1 is determined primarily by the inertia forces which result from the deceleration of the individual parts of the power train, for example the pistons and the connecting rods, and in particular from the deceleration of the flywheel. By changing the mass of the flywheel, the moment of inertia of the flywheel is varied and the inertia forces, or the moment of inertia, acting on the flywheel due to the deceleration during the coasting process is influenced.

Within the scope of the present invention, flywheel mass basically means the entire mass of the flywheel. In contrast, in the case of embodiments which have a flywheel which is of modular construction, flywheel mass means the mass of the at least one flywheel component which is permanently connected by fasteners to the crankshaft.

Because the first flywheel disk 2 is fixed for rotation with crankshaft 1, the corresponding mass affects rotational movement of crankshaft 1 about the rotational axis 7, i.e. the deceleration and the acceleration of crankshaft 1. The second flywheel mass 3 can be selectively separated from, or connected to, base segment 8. The inertia or the moment of inertia of flywheel 4 is decreased by the separation of second flywheel disk 3, or increased by the connection of second flywheel disk 3 to base segment 8, resulting in the coasting movement of crankshaft 1 being shortened or prolonged to provide controlled stopping of crankshaft 1 at one or more predetermined desirable positions for subsequent restarting by direct injection according to one feature of the present invention.

Second flywheel disk 3 is connected to base segment 8 (FIG. 2) or detached from the base segment 8 (FIG. 1) by axial displacement in the direction of the longitudinal axis 6 of crankshaft 1. For this purpose, a thread 5a is provided on the external casing surface of crankshaft 1 and adjoins base segment 8 in the direction of the longitudinal axis 6. Second flywheel segment 3 has a through bore with a thread 5b which corresponds to thread 5a. Threads 5a, 5b are not in engagement with one another when second flywheel segment 3 is arranged detached and spaced apart from base segment 8.

The crankshaft position illustrated in FIG. 1 shows a flywheel 4 with the second flywheel disk 3 separated from base segment 8 and consequently there is no connection or coupling between second flywheel disk 3 and crankshaft 1. In this respect, the mass of second flywheel disk 3 does not have any influence on the coasting movement of crankshaft 1. Only the inertia forces and moments of inertia which act on the base segment 8 influence the rotational movement of crankshaft 1.

When second flywheel disk 3 is separated from base segment 8 while rotating, the kinetic energy stored in the detached, second flywheel segment 3 can be utilized in a variety of ways. A crankshaft 1 which has come to a standstill can be made to rotate again by connecting the two segments 2, 3. In this way the crankshaft 1 can be actively rotated or moved into a preferred position for subsequent restarting according to the present invention. Once crankshaft 1 is in a desired position, the kinetic energy of the detached segment 3 can also be used for restarting the internal combustion engine by connecting the previously detached flywheel segment 3 to the base segment 8 to rotate crankshaft 1.

Figure 2:
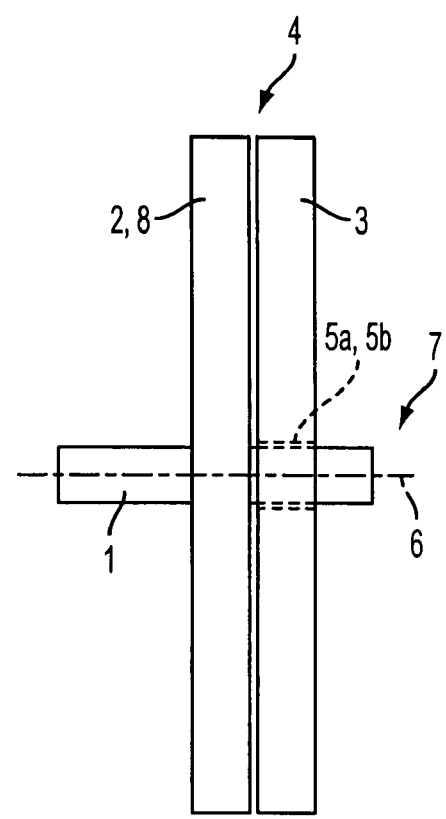
FIG. 2 is a schematic view of the crankshaft and flywheel of FIG. 1 with the flywheel in a second position according to the present invention.

FIG. 2 is a schematic view of crankshaft 1 and flywheel 4 according to the embodiment of the internal combustion engine illustrated in FIG. 1 with second segment 3 coupled to base segment 8. Thread 5*a*, which is provided on the external casing surface of crankshaft 1, is in engagement with a corresponding thread 5*b* of the second flywheel segment 3. In this way, second flywheel segment 3 rotates with rotating crankshaft 1 and is indirectly coupled or connected to flywheel segment 2 with crankshaft 1 serving as a connecting element for the two segments 2, 3.

As illustrated in the embodiment of FIGS. 1 and 2, a system or method for controlled positioning of the crankshaft of an internal combustion engine during shut down to facilitate restarting include a crankshaft and a flywheel with a variable flywheel mass that can be controlled to provide a desired stopping position, to adjust the crankshaft position after stopping without using external energy or fuel, and/or to restart the internal combustion engine.

As previously described, the internal combustion engine according to the invention selectively varies the mass of the flywheel to shut down the internal combustion engine in a controlled fashion, i.e. the rotational movement completed by the crankshaft until it comes to a standstill after the ignition and/or the fuel supply has been switched off is decelerated by varying the flywheel mass in such a way that the crankshaft is stopped in one or more predefined advantageous positions.

The internal combustion engine according to the invention permits restarting in a way which is at the same time simple and saves fuel since the crankshaft can be stopped selectively in what is referred to as a preferred position, i.e. in a crank angle range which can be considered advantageous for starting the internal combustion engine. For example, a spark ignition engine with direct injection can be started directly from the stationary state by injecting fuel into the cylinders and igniting the injected fuel.

The flywheel mass can be minimized for starting or restarting the internal combustion engine, as a result of which the required starting energy is reduced to a minimum. After the successful starting process, the flywheel mass is then increased or set to the magnitude which is necessary for the normal, i.e. regular, operating mode of the internal combustion engine.

The variation of the flywheel mass or the variable flywheel mass can be considered to be a passive adjustment device that varies the flywheel mass to exert a stopping torque associated with the changing moment of inertia of the flywheel on the crankshaft until the crankshaft comes to a stop in the desired or preferred position.

However, as previously described, the embodiment of FIGS. 1 and 2 can also vary the flywheel mass to adjust position of crankshaft I after stopping so that the invention can also serve as an active adjustment device that does not require external energy or fuel.

Use of the flywheel, a component which is basically already present in the internal combustion engine, for controlled engine shut down does not require additional adjustment devices, such as an electric motor to rotate the crankshaft into the desired position after the internal combustion engine has been shut down.

Embodiments of the internal combustion engine of FIGS. 1 and 2 include embodiments where the flywheel is constructed in a modular fashion from at least two flywheel segments which can be connected to one another (possibly via the crankshaft) and detached from one another so that the flywheel mass can be varied at least in two stages, in which case at least one flywheel segment is permanently connected to the crankshaft as a base segment. In this context the at least two flywheel segments can be connected to one another in a frictionally locking or positively locking fashion. The mass of the base segment constitutes the smallest flywheel mass to be implemented, with the maximum flywheel mass being implemented by connecting all the flywheel segments.

Embodiments of the internal combustion engine of FIGS. 1 and 2 include engines having a flywheel with an infinitely or continuously variable flywheel mass. An infinitely variable flywheel mass ensures a maximum degree of flexibility when shutting down the internal combustion engine in one of the preferred positions. In particular, an infinitely variable flywheel mass increases the accuracy of controlling and/or adjusting the stopped crankshaft position relative to the advantageous position or range of positions. An infinitely adjustable flywheel mass can be implemented, for example, by providing a hollow flywheel body 2, 3 which can be selectively filled with liquid, such as an engine fluid or water, for example. Introducing additional liquid into the hollow body increases the flywheel mass while discharging liquid located in the hollow body decreases the flywheel mass.

As previously described, the variation of the flywheel mass according to the invention can also serve as an active adjustment device. The division of the flywheel mass into a plurality of individual masses that can be detached from one another, or use of an infinitely variable flywheel mass allows the crankshaft to be moved into a desired preferred position in a multistage method.

In a first step of the method, the rotating crankshaft is decelerated and brought to a standstill by suitable detachment of individual flywheel segments from the base segment. Within the scope of the first step, the variable flywheel mass thus acts as a passive adjustment device, with the detachment of the flywheel segments taking place before the crankshaft is at a standstill so that the detached flywheel segments can continue to rotate independently of the rotational movement of the crankshaft. In a second step, the detached flywheel segments and the kinetic energy which is stored in them are used to move the crankshaft into a desired, advantageous angular position by partial or complete coupling and/or decoupling of one or more of the flywheel segments. In this context, the variable flywheel then serves as an active adjustment device which however, in contrast to the active adjustment devices which are known from the prior art does not require any external supply of energy. The energy which is necessary to adjust the crankshaft is drawn from the detached flywheel segments or flywheel disks.

Furthermore, the kinetic energy which is stored in a flywheel component which is detached from the crankshaft or the basic segment can be used for restarting.

If the internal combustion engine is to continue to be operated in a switched-off mode instead of in the idling mode, such as when the vehicle is stopped at a traffic light for example, the moment of inertia of the flywheel is changed in a controlled fashion by detaching individual flywheel segments from the base segment after the ignition and/or the fuel supply has been switched off to that the crankshaft comes to a standstill in a known position, preferably in a preferred position. If the traffic light system then switches to green, restarting can be initiated by connecting one or more of the previously detached flywheel segments, which continue to rotate, to the base segment so that their associated kinetic energy is used to rotate the crankshaft and restart the engine.

In operation, a method according to the present invention as illustrated in the embodiments of FIGS. 1 and 2 includes controlling shut down of an internal combustion engine having a crankshaft and a flywheel arranged on the crankshaft to control a stopped position of the crankshaft. The method includes varying or changing the mass of the flywheel to change the inertia or the moment of inertia of the flywheel when the internal combustion engine is shutting down after the ignition and/or the fuel supply has been switched off to influence the coasting movement of the crankshaft and control the crankshaft stopped position.

In the customary driving mode, the flywheel preferably receives its maximum mass in order to minimize the fluctuations in rotational speed as far as possible. The method according to the invention is based on the fact that the coasting process of the crankshaft which occurs after combustion ceases is determined by the inertia forces and moments of inertia occurring as a result of the deceleration of the individual parts of the power train. For this reason, the present invention influences the inertia or mass of a part of the power train in order to control the coasting process of the crankshaft. The flywheel, which is arranged on the crankshaft, serves as a part of the power train that is characterized by comparatively large mass.

The embodiments illustrated and described with reference to FIGS. 1 and 2 include methods where the mass of the flywheel is changed in such a way that the kinetic energy of rotating components after the internal combustion engine has been switched off, until it comes to a standstill, is reduced in a controlled fashion such that the crankshaft is stopped in a predetermined position. Stopping the crankshaft at a known or preferred position provides clarity about the correct injection time and the ignition time at the beginning of the restarting process so that a run-in phase for synchronizing the engine operating parameters is not necessary. A restarting process which is faster and thus in particular saves fuel is made possible. Such a method makes it possible, for example for internal combustion engines with direct injection, to start without a starter, i.e. to start directly from the stationary state, for which fuel merely has to be injected into the combustion chambers of the stationary internal combustion engine and ignited by means of a spark plug.

However, to properly vary the mass or moment of inertia of the flywheel to precisely control the stopping position of the crankshaft generally requires a large amount of information that can be readily obtained using data that has already been measured and/or derived for the customary engine control system, in particular the engine speed, the crankshaft angle, the temperature of the engine, and a temperature that correlates to it such as the coolant temperature and/or the intake pressure in the intake manifold. These variables have been found empirically to have the strongest influence on the coasting movement of the internal combustion engine or of the crankshaft.

It is desirable to determine how much kinetic energy is present in the drive train after the internal combustion engine has been shut down so that the flywheel mass can be appropriately varied to control crankshaft stopping position according to the present invention. A model for the coasting movement of the internal combustion engine is described, for example, in European patent application No. 03101379.0. This model takes into account the current kinetic energy of the drive train, the friction losses and/or the compression processes and expansion processes in the cylinders of the internal combustion engine. Such a model can be acquired on the basis of theoretical considerations and implemented in the form of mathematical equations. However, the model may be entirely, or at least partially, acquired empirically, i.e. by observing the engine behavior and conditioning the measurement data acquired in the process (for example as a look-up table).

Embodiments of a method according to the present invention for controlling crankshaft position to facilitate restarting an internal combustion engine having a flywheel including a base segment secured to a crankshaft and at least one selectively connectable segment to provide a variable mass flywheel include separating at least one connectable flywheel segment from the base segment before the crankshaft stops rotating. If the crankshaft is not in a preferred position when it comes to a standstill, the kinetic energy of the at least one separated flywheel segment is utilized to rotate the crankshaft into a preferred position by selectively connecting the at least one separated segment to the base segment.

In this method according to the present invention, the position of the crankshaft is influenced both actively and passively, i.e. the flywheel segments which were previously detached from the base segment within the scope of the passive deceleration process are used to adjust crankshaft position after the crankshaft has come to a standstill a first time by reconnecting one or more rotating segments to the base segment. This method may include repeatedly connecting and disconnecting one or more segments if the crankshaft is not in a preferred position after the crankshaft has been adjusted and stopped again.

Embodiments of methods for restarting an internal combustion engine having a flywheel with a base segment and at least one detachable segment to provide a variable mass flywheel include separating at least one detachable segment from the base segment before the crankshaft comes to a standstill, and using kinetic energy of the at least one separated flywheel segment to start the internal combustion engine again by connecting at least one separated segment to the base segment to accelerate the crankshaft.

After the internal combustion engine has started successfully, flywheel segments which are possibly still detached or separated are connected to the base segment for the regular operation of the internal combustion engine.

Figure 3:
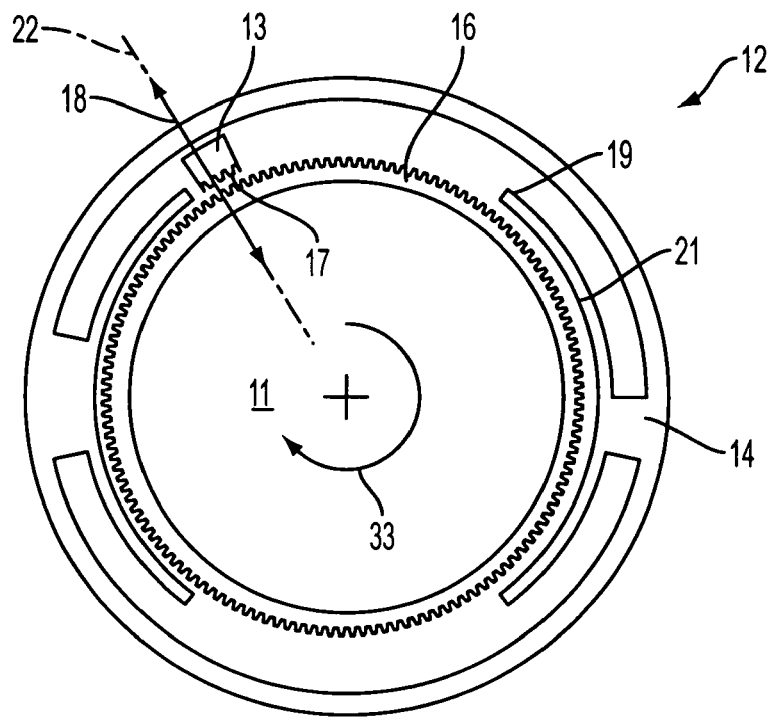
FIG. 3 illustrates a crankshaft with an associated fixed stopping device according to one embodiment of the present invention.

Referring now to FIG. 3, another embodiment for controlling stopping position of a crankshaft during shutdown of an internal combustion engine is shown. The internal combustion engine has a blocking device 12 for the crankshaft 11. The blocking device 12 is brought into engagement with the crankshaft 11 when the internal combustion engine runs down after fuel an/or ignition has been switched off. The blocking device 12 has an engagement element 13 and a rigid holding element 14. The engagement element 13 is assigned movably to the holding element 14, so that, during a last crankshaft revolution, the engagement element 13 can be connected to a counterengagement element 16 assigned to the crankshaft 11, in such a way that the crankshaft 11, in its position of rest, can be set in a determined position. According to the invention, the predetermined position is defined as a crank angle range in which a direct starterless starting of the internal combustion engine is possible, with at least one piston being in a position favorable for this purpose.

The engagement element 13 is designed with a toothed engagement side 17 and is brought into engagement with the counterengagement element 16 in a radial direction 18 with respect to the crankshaft 11, the counterengagement element 16 being designed as a toothed ring complementary to the toothed engagement side 17. The engagement element 13 may have a quadrangular design, as seen in cross section. The counterengagement element 16 may be arranged directly on the crankshaft 11, or alternatively on a shaft connected to the crankshaft 11.

The holding element 14 is connected to a nonrotatable engine element, preferably to an engine block. The holding element 14 may, of course, be screwed to the engine element with a frictional form fit or press fit or be produced in one piece with the engine element directly during the production of the latter. In a preferred embodiment, the holding element 14 is arranged in an interior of the internal combustion engine, in particular in an interior of the engine block. However, the holding element 14 may, of course, also be arranged outside the engine block.

The holding element 14 is designed in a similar way to an armature of an electric motor as seen in cross section, and has at least one abutment end 19 arranged in the circumferential direction, and in this case armature webs 21 of the holding element 14 which are located opposite to one another, as seen in cross section, each cover approximately one quarter of the circumference of the crankshaft 11 or of the counterengagement element 16.

The engagement element 13 is connected to the holding element 14 movably in the radial direction 18. For this purpose, a suitable guide device is provided on the holding element 14.

In the exemplary embodiment illustrated in FIG. 3, the engagement element 13 is arranged in a preferred stop position 22 which is selected such that the crankshaft 11 is stopped in the predetermined position when the engagement element 13 is engaged or shifted into the counterengagement element 14.

The engagement element 13 is activated via a central engine control unit, which preferably also controls the rundown of the internal combustion engine, in such a way that, when the internal combustion engine runs down, in particular during a last crankshaft revolution, the engagement element is connected abruptly to the counterengagement element 16, to produce a frictional form-fit connection in which the crankshaft 11 is stopped in the predetermined position. The engagement element 13 can be actuated hydraulically, mechanically, pneumatically and/or electrically depending upon the particular application and implementation.

Figure 4:
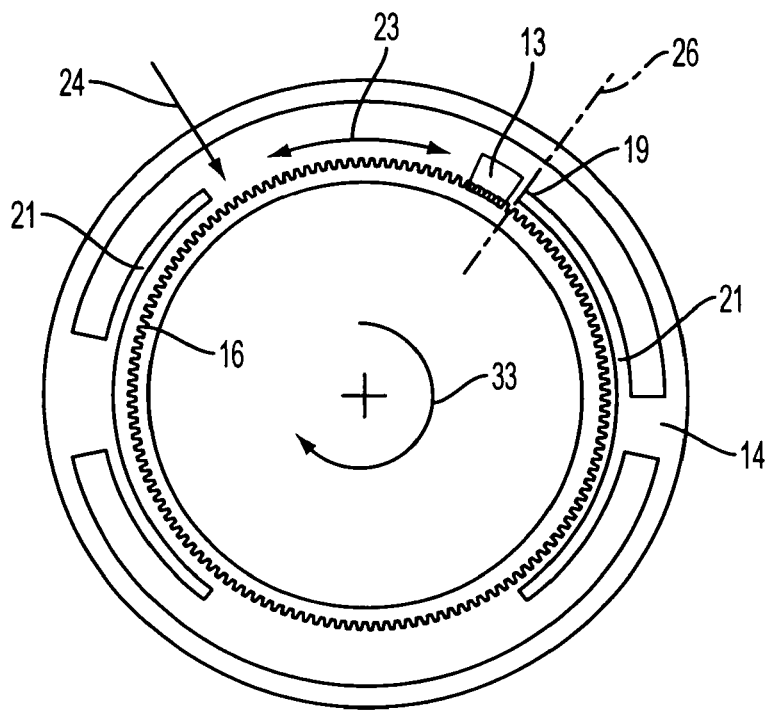
FIG. 4 illustrates a stopping device with limited circumferential movement according to one embodiment of the present invention.

In contrast to the exemplary embodiment illustrated in FIG. 3, in the exemplary embodiment illustrated in FIG. 4 the holding element 14 has a guide device for the engagement element 13, so that the latter can not only be moved in the radial direction 18, but also in a circumferential direction 23. This guide device may, for example, be a slotted guide which is introduced into the holding element 14. A smooth braking of the crankshaft can thereby be achieved until the desired stop position is reached.

The engagement element 13 is activated by the central engine control unit in such a way that engagement element 13 is brought into engagement with the counterengagement element 16 at a shift-in point 24. In the exemplary embodiment illustrated in FIG. 4, the shift-in point 24 is displaced counterclockwise at about 30° from the zenith of the crankshaft 11 in relation to the example illustrated in FIG. 3, so that, in the shifted-in or engaged state, the engagement device 13 is taken up in the circumferential direction 23 as far as the abutment end 19 according to the crankshaft revolution. The arrangement of the abutment end 19 corresponds to a preferred stop position 26 or the predetermined position in which the crankshaft 11 is arranged in the crankshaft angle range in which a direct starterless starting of the internal combustion engine is possible.

Figure 5:
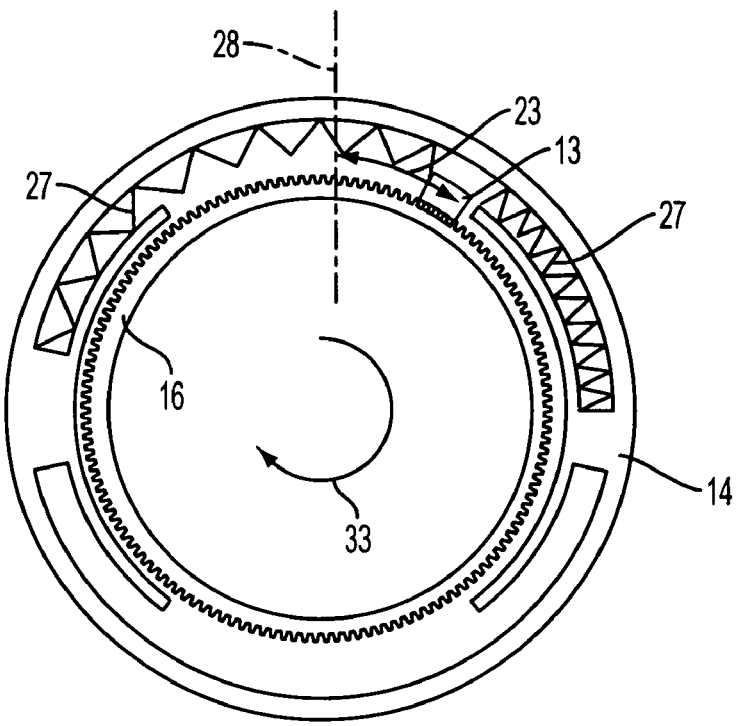
FIG. 5 illustrates a stopping or blocking device with associated force accumulator elements according to one embodiment of the present invention.

In the exemplary embodiment illustrated in FIG. 5, the engagement element 13 is connected to force accumulator elements 27 which are fastened at each end to the holding element 14. In the exemplary embodiment illustrated, the force accumulator elements 27 are designed as springs. A flexible blocking device 11 is consequently made available, in which, in particular, the engagement element 13 is mounted flexibly in the circumferential direction 23 by means of the force accumulator elements 27. FIG. 5 shows the engagement element 13 in a shifted-in deflected state. In this case, both force accumulator elements 27 are prestressed with one in tension and one in compression.

To achieve a smooth braking of the crankshaft during its last revolution, it is beneficial if the engagement element is fastened to at least one force accumulator element 27 which is connected at the other end to the holding element 14. In a preferred embodiment, the force accumulator element 27 is designed as a spring, in which case, after the shift or engagement of the engagement element 13 into the counterengagement element 16, the force accumulator element is first tensioned in the circumferential direction 23, until the engagement element abuts against the abutment end 19, in order then to be returned into the predetermined position 28 according to an equilibrium of the spring force. In this case, the force accumulator element 27 takes up the shifted-in engagement device 13 and therefore the crankshaft. It is, of course, possible to provide one or more force accumulator elements 27 on each of the two sides of the engagement element 13, as seen in cross section, so that the engagement element 13 is embedded in two or more springs. By virtue of the flexible mounting of the blocking device, in particular the flexible expansion of the springs 27, a very smooth engagement process is made available. After the engagement element 13 has been engaged into the counterengagement element 16, the springs 27 are tensioned during the crankshaft revolution, the crankshaft subsequently being moved to the predetermined position by the equilibrium forces of the force accumulator elements 27.

After the engagement or shift of the engagement element 13 to the counterengagement element 16, with a crank angle position 28 being reached, the engagement element 13 rotates in the circumferential direction 23 with the crankshaft 11 or the counterengagement element 16, with the result that at least some of the force accumulator elements 27 are tensioned. A smooth braking of the crankshaft 11 is thereby achieved, the prestressed force accumulator elements 27 bringing about a return movement of the engagement element 13, so that the crankshaft 11 is disposed approximately in the preferred stop position 28 or the predetermined position when the forces of the force accumulator elements 27 are at equilibrium.

Figure 6:
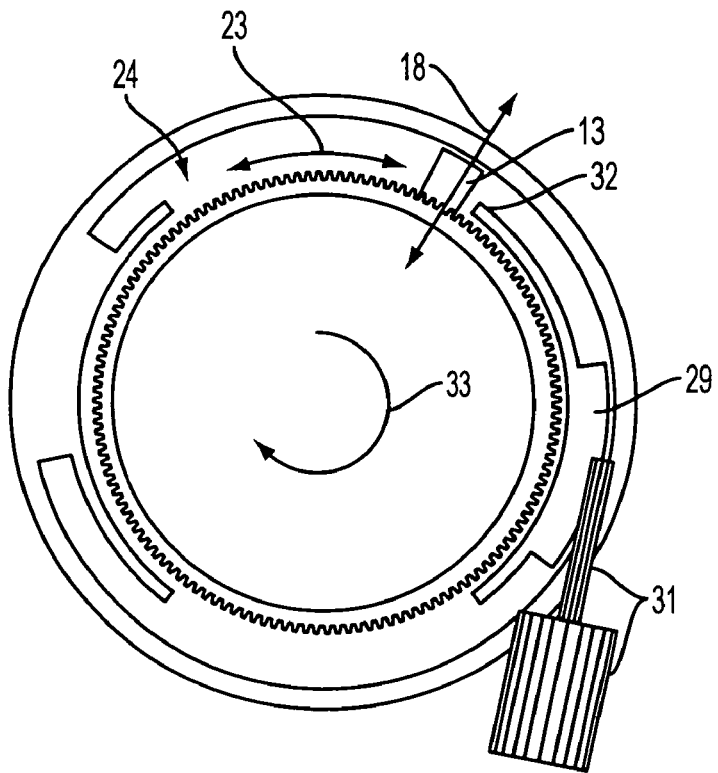
FIG. 6 illustrates a stopping or blocking device with an associated crankshaft positioning device according to one embodiment of the present invention.

In an exemplary embodiment illustrated in FIG. 6, the blocking device 12 includes a positioning ring 29 which can be moved in a circumferential direction 23 via a positioning device 31. The exemplary embodiment illustrated in FIG. 6 otherwise corresponds to the exemplary embodiment according to FIG. 4, with one of the armature webs 21 having been replaced by the positioning ring 29, the positioning ring 29 being assigned an abutment end 32. The positioning ring 29 is designed in such a way that it covers approximately one quarter of the circumference of the crankshaft 11 or of the counterengagement element 16. In the exemplary embodiment illustrated in FIG. 6, the engagement element 13 rotates, together with the crankshaft 11 or the counterengagement element 16, until the engagement element 13 abuts against the abutment end 32, and in this case the crankshaft 11 or the counterengagement element 16 may, of course, also be stopped automatically shortly before the abutment end 32. The positioning ring 29 may advantageously be set in such a way that it is arranged in an optimum position, so that the internal combustion engine can run down smoothly. After the crankshaft 11 has been stopped, it can be set into the predetermined position as a result of the action of the positioning ring 29 on the engagement element 13. For this purpose, the positioning ring 29 is simply rotated in a circumferential direction 23 opposite to the normal direction of rotation by means of the positioning device 31. The positioning device 31 can be actuated electrically, hydraulically, mechanically or pneumatically, and the positioning ring 29 may, of course, also be designed with force accumulator elements according to the exemplary embodiment of FIG. 5. Of course, this embodiment may also include provision for the engagement element 13 to be provided with at least one force accumulator which is connected at the other end to the holding element.

Figure 7:
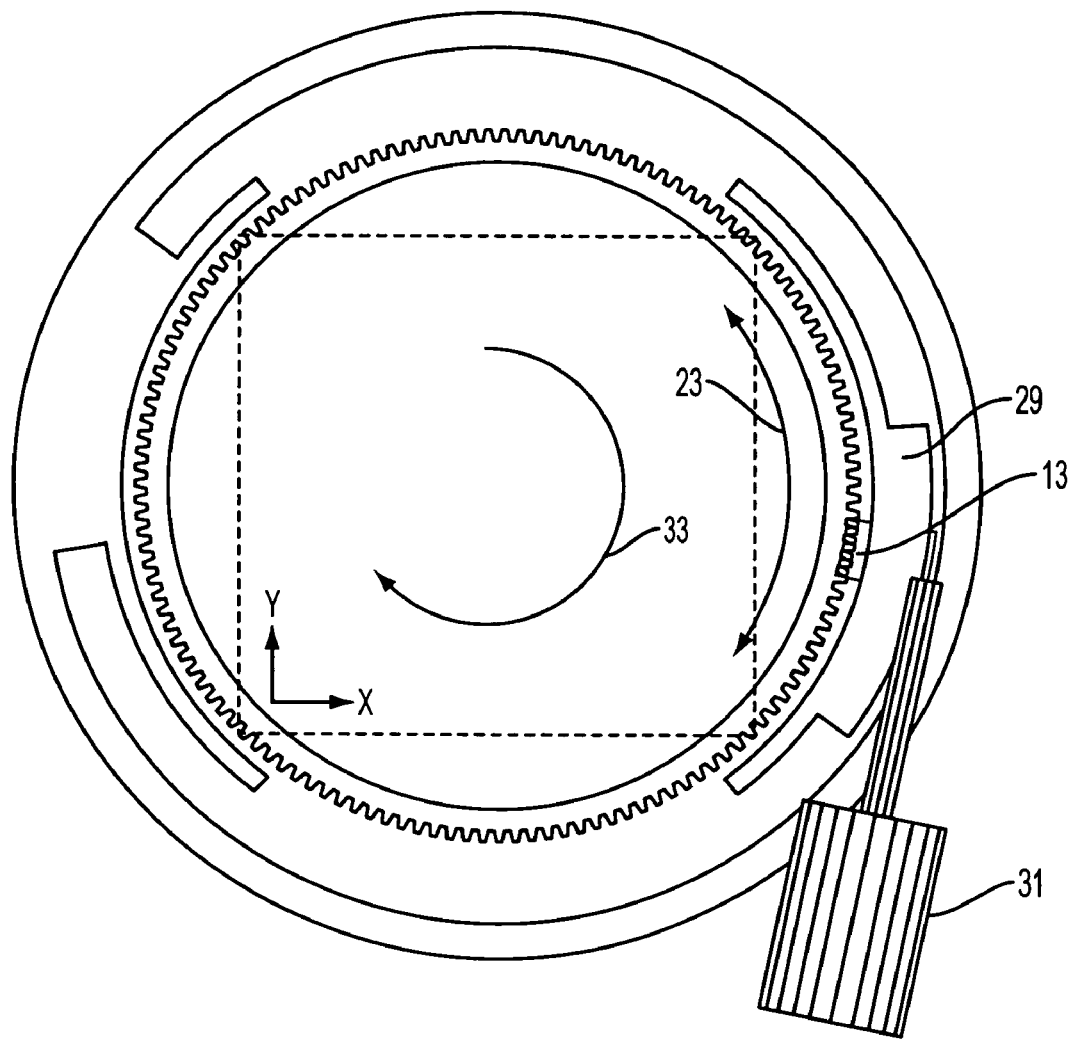
FIG. 7 illustrates a crankshaft with an engagement element integrated in a positioning ring according to one embodiment of the present invention.

In contrast to the exemplary embodiment illustrated in FIG. 6, the engagement element 13 in the exemplary embodiment illustrated in FIG. 7 is integrated into the positioning ring 29. In this case, as in the exemplary embodiment illustrated in FIG. 3, the engagement element 13 is arranged in a fixed position in relation to the crankcase. The crankshaft 11 is consequently stopped abruptly as a result of the engagement or shift of the engagement element 13 into the counterengagement element 16, and in this case the shift-in or locking position may be selected in such a way that a smooth run down of the internal combustion engine is ensured. After the crankshaft 11 has been stopped, it can be set into the predetermined position via the engagement element 13 or the acting positioning device 31. It is, of course, within the scope of the invention if the engagement element 13 or the engagement element integrated in the positioning ring 19 is activated via a central engine control unit which also controls the rundown of the internal combustion engine, in order to obtain the suitable, predetermined position of the crankshaft so as to achieve a direct, starterless starting of the internal combustion engine, so as to ensure that the at least one piston is in a position favorable for this purpose.

A friction-type connection (not illustrated) of the engagement element to the counterengagement element may, of course, also be provided instead of the frictional form-fit or toothed connection, in which case these elements would then have to be designed accordingly. It is, of course, within the scope of the invention that the engagement element 13 or the engagement element 13 integrated in the positioning ring 29 is shifted out of the counterengagement element 16 before the starting of the internal combustion engine, as illustrated in FIGS. 3 and 5 by the double arrow 18 which designates the radial direction. In all the exemplary embodiments, an illustrative direction of rotation of the crankshaft 11 is designated by the arrow 33.

Use of a blocking device according to embodiments of the present invention as illustrated in FIGS. 3-7 positions at least one piston of the internal combustion engine in a specific, favorable configuration corresponding to a specific angle range or angular position of the crankshaft. An improved blocking device is consequently made available, by means of which it is possible to bring about a starterless direct starting of the internal combustion engine.

Figure 8:
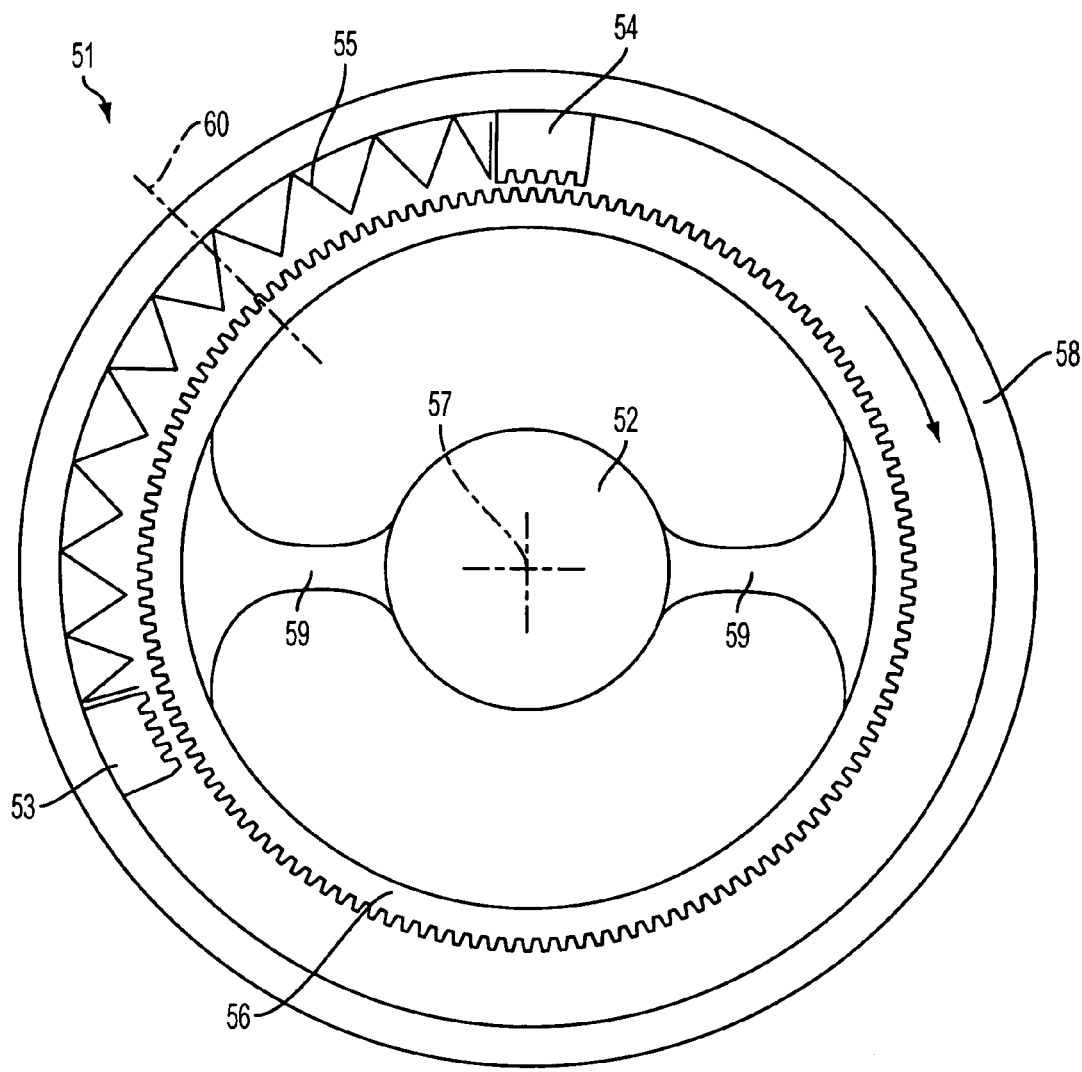
FIG. 8 illustrates a stopping/restarting and position adjustment device in an engine operating position according to one embodiment of the present invention.

FIG. 8 illustrates an adjustment device of one embodiment of an internal combustion engine having a device for the controlled shutting down and starting of the internal combustion engine to position a crankshaft. As shown in FIGS. 8-12, embodiments of the invention include a first locking element which can be coupled optionally to either the internal combustion engine or the crankshaft, or which can be coupled to the internal combustion engine and the crankshaft. Similarly, the invention includes a second locking element which can be coupled optionally to either the internal combustion engine or the crankshaft, or which can be coupled to both the internal combustion engine and the crankshaft. The two locking elements are arranged spaced apart from one another on the circumference of the crankshaft and a spring element extends between the first locking element and the second locking element as described in greater detail below.

As shown in FIG. 8, a crown gear 56 is attached to a crankshaft 52 by spokes 59. Two locking elements 53, 54 constructed in a radially displaceable fashion are arranged on the outer circumference of crown gear 56. As a result, locking elements 53, 54 can, on the one hand, be engaged with the crown gear 56 permitting them to be coupled to the crankshaft 52, and on the other hand can be coupled to securing means 58 which are fixed to the engine to secure elements 53, 54.

In a similar manner a friction wheel may be used instead of crown gear 56 to provide an infinitely variable adjustment with corresponding frictional locking elements 53, 54 engaged on the circumference of the friction wheel and thus on the circumference of the crankshaft to increase the positioning accuracy when setting the preferred positions. The connection which is produced when there is a coupling between the locking element and friction wheel is a frictionally locking connection that requires a constant force on locking elements 53, 54 to maintain engagement with the friction wheel.

In the position of device 51 as illustrated in FIG. 8, both locking elements 53, 54 are coupled exclusively to the securing ring 58 so that locking elements 53, 54 do not rotate with crankshaft 52, which rotates about axis 57 of rotation in the normal engine operating mode. A spring element 55 is disposed between locking elements 53, 54 and is deformed when locking elements 53, 54 move relative to one another, i.e. when the distance between the two elements 53, 54 is increased or decreased. The dot-dash line 60 indicates the point where first locking element 53 must stop for crankshaft 52 to be located in a preferred position 60.

Figure 9:
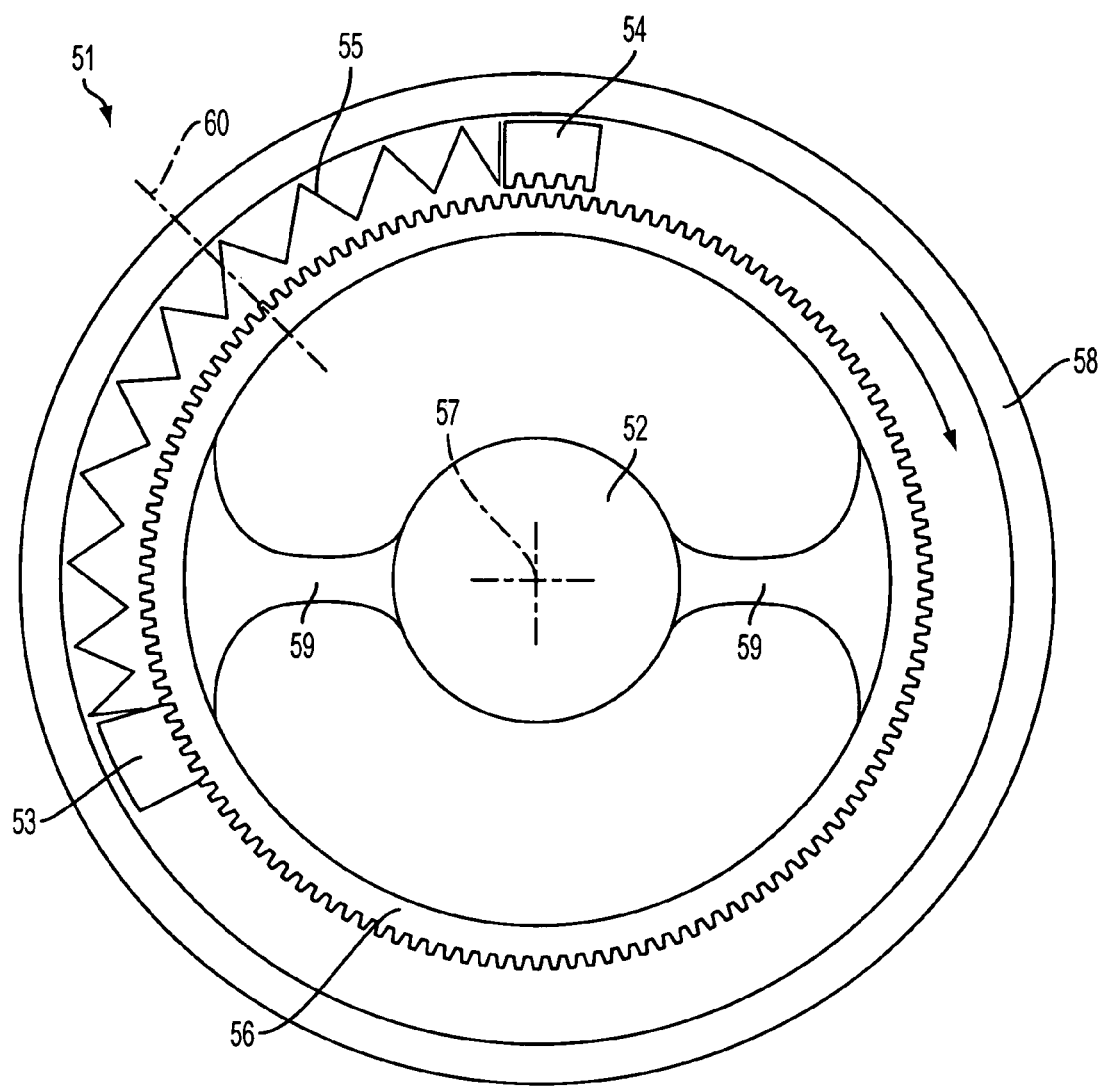
FIG. 9 illustrates the stopping/restarting and position adjustment device of FIG. 8 shortly after the internal combustion engine has been shut down.

FIG. 9 illustrates device 51 of FIG. 8 shortly after the internal combustion engine has been shut down. First locking element 53 is in engagement with crown gear 56 and is therefore coupled to crankshaft 52. At the same time, locking element 53 has been released from securing ring 58 or decoupled from the internal combustion engine so that it can begin rotating in the direction of crankshaft 52. Second locking element 54 remains coupled to the internal combustion engine or to the securing ring 58 so that it is fixed in position while first locking element 53 moves toward second locking element 54 around the crankshaft 52 as crankshaft 52 comes to a stop at preferred position 60 as shown in FIG. 10 where crankshaft 52 is stationary.

Figure 10:
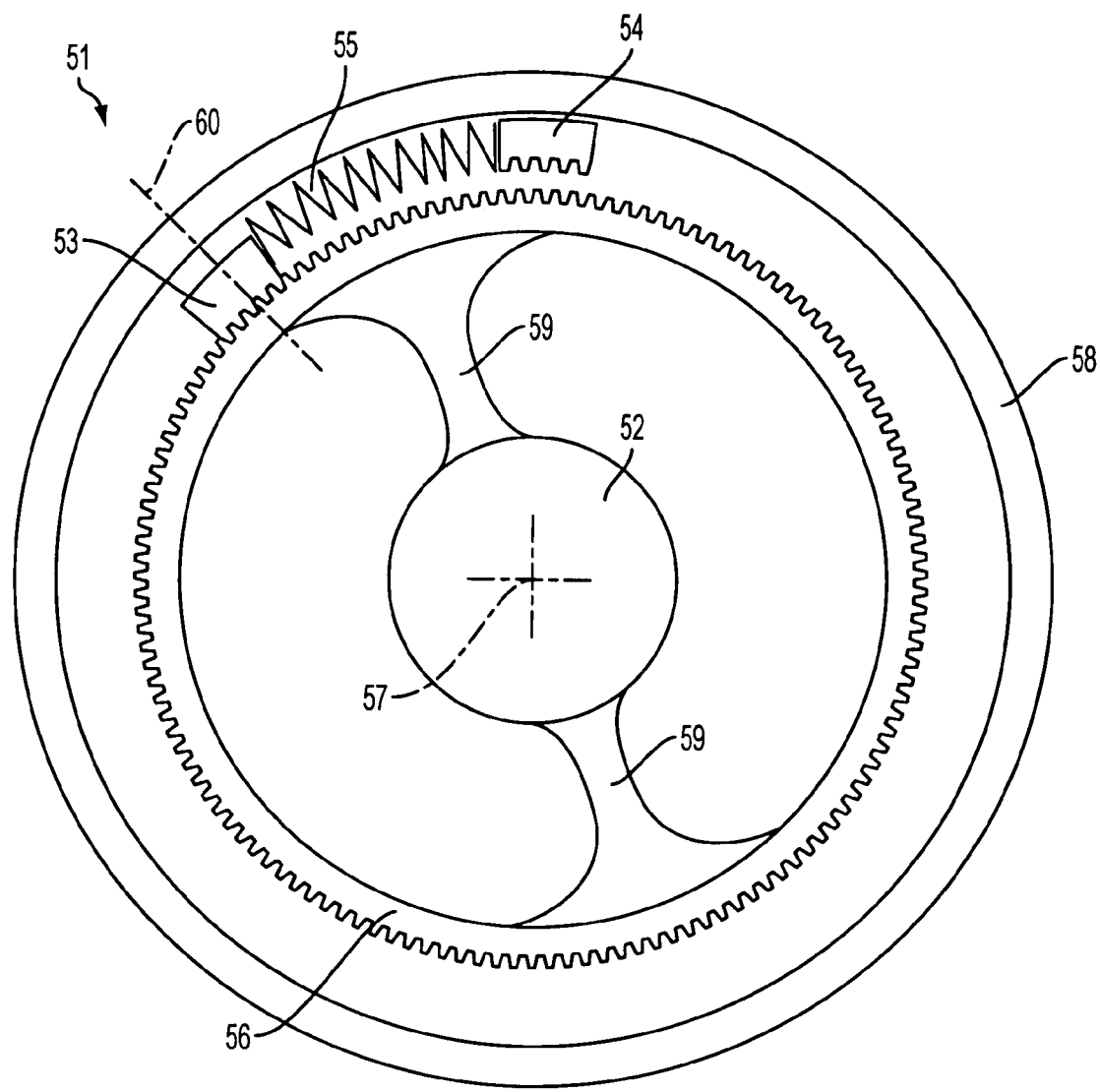
FIG. 10 illustrates the stopping/restarting and position adjustment device of FIG. 8 when the internal combustion engine and/or the crankshaft is in a stationary state.

As shown in FIG. 10, the shut down process results in spring element 55 being compressed with an increased spring force that acts on crankshaft 52 to decelerate crankshaft 52 and stop it in the preferred position 60. In the process, the kinetic energy of the crankshaft 52 is reduced and at least partially absorbed by spring element 55. After preferred position 60 has been reached or when crankshaft 52 is stationary, first locking element 53 is coupled to securing ring 58 so spring element 55 remains compressed and crankshaft 52 is secured in the preferred position. Because second locking element 54 is coupled to the engine during the deceleration process (see FIGS. 9-10) and first locking element 53 is coupled to crankshaft 52 and rotates, the additional coupling of first locking element 53 to the engine when crankshaft 52 is stationary causes crankshaft 52 to be secured in the position of rest or stopped position and at the same time causes the spring element 55 to be remain compressed between locking elements 53, 54. The energy stored in the compressed spring element 55 can advantageously be used to start the internal combustion engine.

Figure 11:
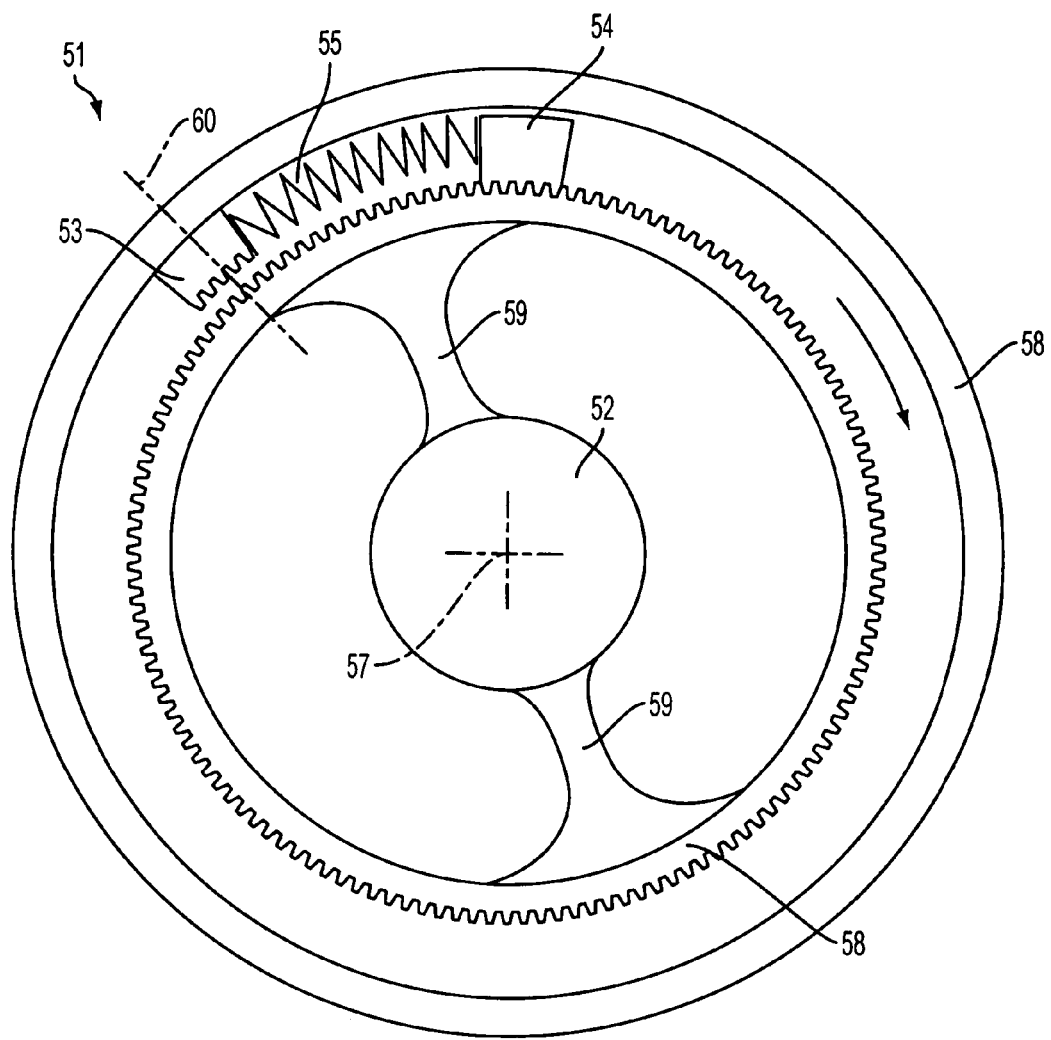
FIG. 11 illustrates the stopping/restarting and position adjustment device of FIG. 8 at the beginning of the starting process.

FIG. 11 illustrates adjustment/starting device 51 at the beginning of the engine starting process. Second locking element 54 is in engagement with crown gear 56. At the same time, locking element 54 is decoupled from securing ring 58 so that it begins to rotate with crankshaft 52. To start the engine, first locking element 53 is decoupled from crankshaft 52 and crankshaft 52 is released. Beginning from the stopped position illustrated in FIGS. 10-11 where spring element 55 is compressed or preloaded, crankshaft 52 is then accelerated by the spring force as spring element 55 is released and locking elements 53, 54 are forced apart from one another. Second locking element 54 rotates crankshaft 52 using energy stored in spring element 55 and the internal combustion engine is started.

Figure 12:
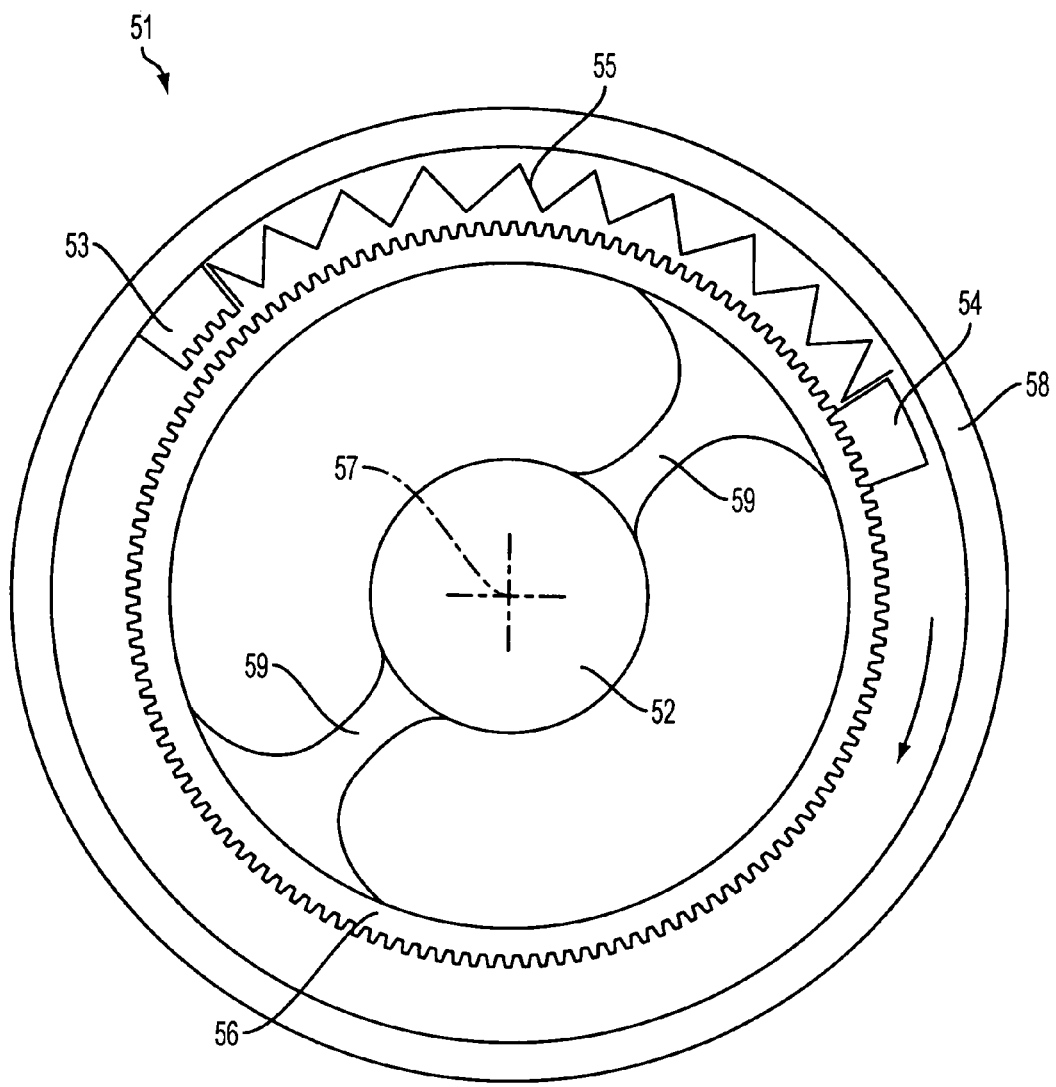
FIG. 12 illustrates the stopping/restarting and position adjustment device of FIG. 8 near the end of the engine starting process.

FIG. 12 shows device 51 toward the end of an engine starting process. After the starting process, both locking elements 53, 54 are coupled to the internal combustion engine and decoupled from crankshaft 52 for the normal operating mode of the internal combustion engine as shown in FIG. 8.

As illustrated and described with respect to the embodiments of FIGS. 8-12, components that are coupled to one another are connected to one another and essentially cannot carry out any movements relative to one another. If a locking element is coupled to the internal combustion engine, this locking element is secured to the internal combustion engine. A locking element which is coupled to the crankshaft rotates with the crankshaft provided that the element is not simultaneously coupled to the internal combustion engine. In the case mentioned last, the crankshaft is also secured relative to the internal combustion engine in a defined position, i.e. in a defined crank angle position, specifically by means of the locking element.

Similar to previously described embodiments of the present invention, the components can be coupled directly or with the intermediate connection of further components. Consequently, if the locking element is coupled to the crankshaft or to the internal combustion engine, it is either directly engaged with the crankshaft or the internal combustion engine, or indirectly with the intermediate connection of further components and elements.

The coupling of two components can be brought about selectively and reversed again. If this is carried out in the specific sequence and in a coordinated fashion at corresponding times, the internal combustion engine can be shut down in a controlled fashion, i.e. kinetic energy of the internal combustion engine produced until it comes to a standstill after the ignition and/or the fuel supply has been switched off is reduced by means of the spring element arranged between the locking elements, in such a way that the crankshaft is stopped in one or more predetermined positions. As the internal combustion engine is shut down, the spring element serves to reduce the kinetic energy of the rotational movement of the crankshaft and the kinetic energy of the drive train overall by absorbing this energy by compression or extension. The deformation of the spring element, i.e. the compression or extension, is associated with the two locking elements moving relative to one another. As a result the distance between the elements is changed and the spring element which is arranged between the elements is deformed.

According to the invention, the spring element can be compressed or extended during the shutting down process. In the process, the locking elements may move toward one another or away from one another. Both embodiments lead to the intended goal, with compression of the spring element being preferred.

The device according to the invention for shutting down the internal combustion engine at the same time permits simple restarting using energy stored in the spring element during the shutting down process to rotate the crankshaft during restarting. Consequently, the energy necessary for restarting need not be supplied from an external source such that the invention is distinguished in particular by low energy consumption, which is already exhausted in the actuation and the adjustment of the locking elements.

The device according to the invention can basically be seen as a passive adjustment device in which, by suitable actuation of the locking elements, a torque is exerted on the crankshaft until the crankshaft comes to a standstill, preferably in the desired, preferred position.

The device according to the invention can, moreover, also serve as an active adjustment device, with the crankshaft being moved into a desired, preferred position in a multistage method. In the process, the rotating crankshaft is decelerated in a first step and brought to a standstill, with the spring element being deformed. Within the scope of the first step, the device thus functions as a passive adjustment device. In the second step, at least some of the energy stored in the spring element is used to move the crankshaft into a predefined, advantageous angular position. In this context, the device then serves as an active adjustment device that does not require any external supply of energy.

A remainder of stored energy can be used for restarting. Locating the crankshaft in a preferred position during shut down provides clarity or certainty about the correct injection time and ignition time at the beginning of the restarting process so that a run-in phase is not necessary to synchronize the engine operating parameters. The invention thereby provides a restarting process that is fast and fuel efficient.

Embodiments of an internal combustion engine as illustrated in FIGS. 8-12 may include at least one brake permanently connected to the internal combustion engine. Locking elements 53, 54 are then coupled to the brake to operate as previously described. Depending upon the particular application, a separate brake can be provided for each locking element, or a common brake can be provided for both locking elements. The at least one brake may include a disc brake, although other types of brakes may be used advantageously. The two locking elements may be arranged on the inside of the brake if desired.

Methods for controlled shutdown and restarting of an internal combustion engine as illustrated in FIGS. 8-12 may include coupling both locking elements to the internal combustion engine and not to the crankshaft while the engine is operating. After the ignition and/or the fuel supply have been switched off, the first locking element is decoupled from the internal combustion engine and coupled to the crankshaft, while the second locking element remains coupled to the internal combustion engine. The two locking elements move relative to one another and kinetic energy is transferred from the rotating components to the spring element which is arranged between the locking elements. As a result, the crankshaft is decelerated and the energy which is emitted after the internal combustion engine has been switched off until the crankshaft comes to a standstill is at least partially absorbed or stored in the spring element so that the crankshaft stops in one or more predefined advantageous positions. The first locking element is preferably coupled to the internal combustion engine as soon as the crankshaft is stationary. In this way, the crankshaft is secured in the position of rest which it has reached since the first locking element is coupled both to the internal combustion engine and to the crankshaft.

Methods for restarting the engine according to embodiments illustrated in FIGS. 8-12 include starting from a stopped position where at least one spring element is preloaded in tension or compression and where the first locking element is coupled to the internal combustion engine and to the crankshaft and the second locking element is coupled to the internal combustion engine but not to the crankshaft. The first locking element is then decoupled from the crankshaft and the second locking element is decoupled from the internal combustion engine and coupled to the crankshaft so the two locking elements are moved relative to one another and energy stored in the preloaded spring element arranged between the locking elements is transferred to the crankshaft to rotate the crankshaft and start the engine.

Figure 13:
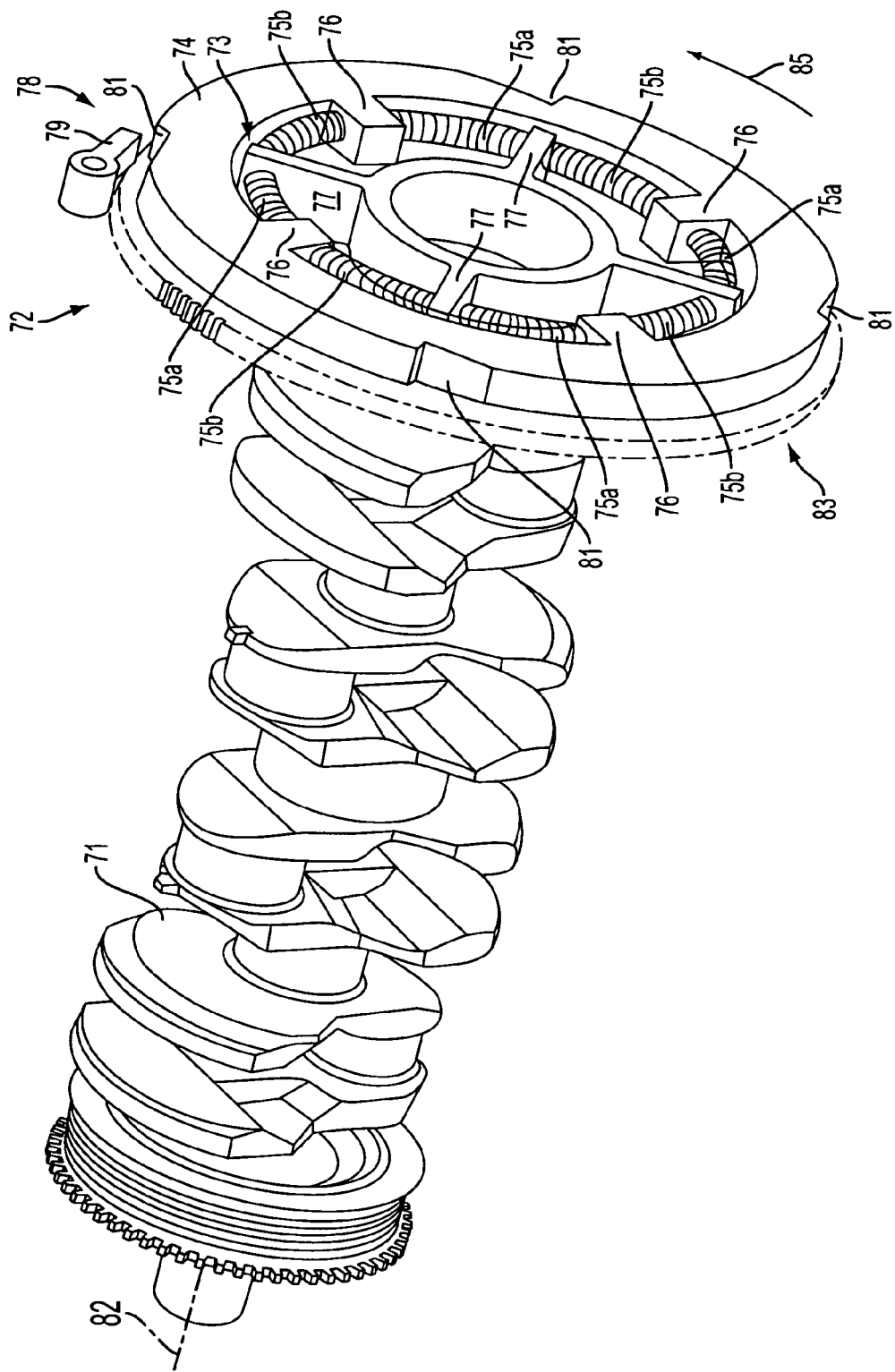
FIG. 13 is a perspective illustration of a crankshaft and flywheel for controlled stopping and restarting according to one embodiment of the present invention.

FIG. 13 illustrates a crankshaft 71 and flywheel 72 for use in controlled shutdown and restarting of an internal combustion engine according to one embodiment of the present invention. Flywheel 72 is arranged at end 83 of crankshaft 71. Flywheel 72 is constructed in a modular fashion from two flywheel segments 73, 74, with the two flywheel segments 73, 74 being constructed in the form of flywheel disks similar to the embodiments described with reference to FIGS. 1 and 2. In this embodiment, flywheel segments 73, 74 are connected to one another by spring elements 75a, 75b. First flywheel segment or base segment 73 is permanently connected to the crankshaft 71 and includes four radially outwardly protruding wings 77 that project into four intermediate spaces 84 formed by four projections 76 protruding radially inward from second flywheel segment 74, which is of annular design. A spring element 75a, 75b is arranged in each case between a wing 77 and a projection 76 so that a total of eight spring elements 75a, 75b are used.

Second flywheel segment 74 is thus not connected directly to crankshaft 71 but instead with the intermediate connection of spring elements 75a, 75b such that second flywheel segment 74 can rotate with respect to crankshaft 71 and first flywheel segment 73, which is fixedly connected to crankshaft 71, said rotation being accompanied by loading of spring elements 75a, 75b.

Wing 77 and projection 76 overlap in the radial direction so that spring elements 75a, 75b can be arranged on a circular arc in the circumferential direction around the rotational axis 82 of the crankshaft. In this way, the axes of spring elements 75a, 75b essentially correspond with the main loading direction when flywheel segments 73, 74 are rotated with respect to one another.

In the embodiment shown in FIG. 13, a pivotable bolt 79 is provided as the locking device 78 and is engaged by pivoting with one of a total of four cutouts 81 which are arranged on the outer casing surface of second flywheel segment 74 to prevent subsequent rotation of second flywheel segment 74. The number of cutouts 81 shows that generally there is more than one preferred stopping position for crankshaft 71 depending on the number of cylinders and engine configuration. In the stopped, non-rotating condition shown in FIG. 13, locking device 78 is released so that second flywheel segment 74 is mounted in a freely rotatable fashion on crankshaft 71 by spring elements 75a, 75b. If the internal combustion engine is started from this position of rest, spring elements 75a, 75b are forcibly preloaded. First flywheel segment 73 is fixedly connected to and rotates with crankshaft 71. Second flywheel segment 74 is connected by spring elements 75a, 75b to segment 73 so it also begins to rotate. In the process, spring elements 75a, which are positioned in front of the wings 77 viewed in the direction of rotation (arrow), are compressed, while spring elements 75b on the side of wings 77 facing away from the direction 85 of rotation are subjected to tensile loading. As such, the resilient coupling of second flywheel segment 74 to crankshaft 71 by spring elements 75a, 75b, rotates second flywheel segment 74 through a specific angle with respect to the crankshaft 71.

Figure 14:
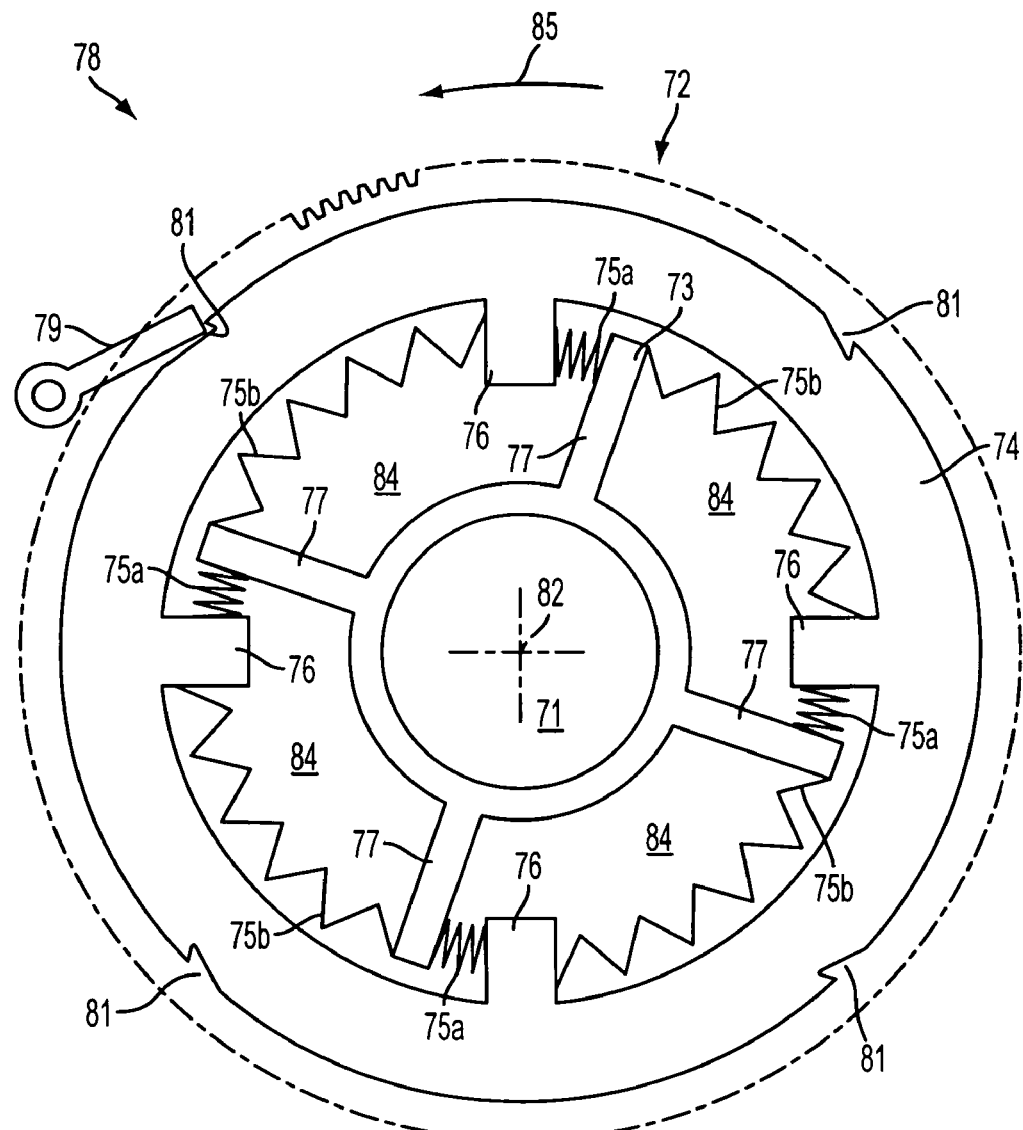
FIG. 14 is a schematic front view of the embodiment of FIG. 13.

FIG. 14 is a schematic side view of flywheel 72 according to the embodiment illustrated in FIG. 13 with second flywheel segment 74 secured in a rotationally fixed fashion by pivoting bolt 79. When the engine is shutting down, second flywheel segment 74 is locked by pivoting bolt 79 as crankshaft 71 rotates. Bolt 79 engages a cutout 81 on second flywheel segment 74. First flywheel segment 73 is then decelerated together with crankshaft 71 as spring elements 75a, 75b are loaded with crankshaft 71 being stopped by second flywheel segment 74. Spring elements 75a, 75b both perform the function of rotating second flywheel segment 74 as the crankshaft 71 rotates and the function of ensuring gentle coasting of crankshaft 71 during shut down of the engine. Second flywheel segment 74 is secured to the engine by first locking device 78, which takes place abruptly as a result of the pivoting of the bolt 79.

Crankshaft 71 is decelerated to a standstill with loading of spring elements 75a, 75b. First flywheel segment 73, together with crankshaft 71, is decelerated by the increasing spring forces while first flywheel segment 73 is supported on the fixedly locked second flywheel segment 74 by spring elements 75a, 75b.

When the internal combustion engine is out of operation and crankshaft 71 is stationary, the at least one spring element 75 assumes a stable position when the at least two flywheel segments 73, 74 can be rotated with respect to one another. If just one spring element is used, the stable position is defined by the fact that a spring force is not present and the spring element is not preloaded, i.e. is loaded neither in tension nor in compression. When more than one spring element is used, the stable position is defined by the fact that the spring forces of the individual spring elements are in equilibrium with one another.

In the internal combustion engine according to the invention, the at least one spring element assumes a plurality of tasks. On the one hand, it has the function of resiliently coupling the second flywheel segment when the crankshaft is rotating. The at least one spring element therefore has the function of a driver. On the other hand, at least one spring element ensures gentle coasting of the crankshaft and thus controlled shutting down of the internal combustion engine. After the ignition and/or the fuel supply have been shut down, the second flywheel segment is secured to the engine by means of the first locking device, which takes place more or less abruptly and can be simply damped by a locking device which is of resilient design.

Figure 15:
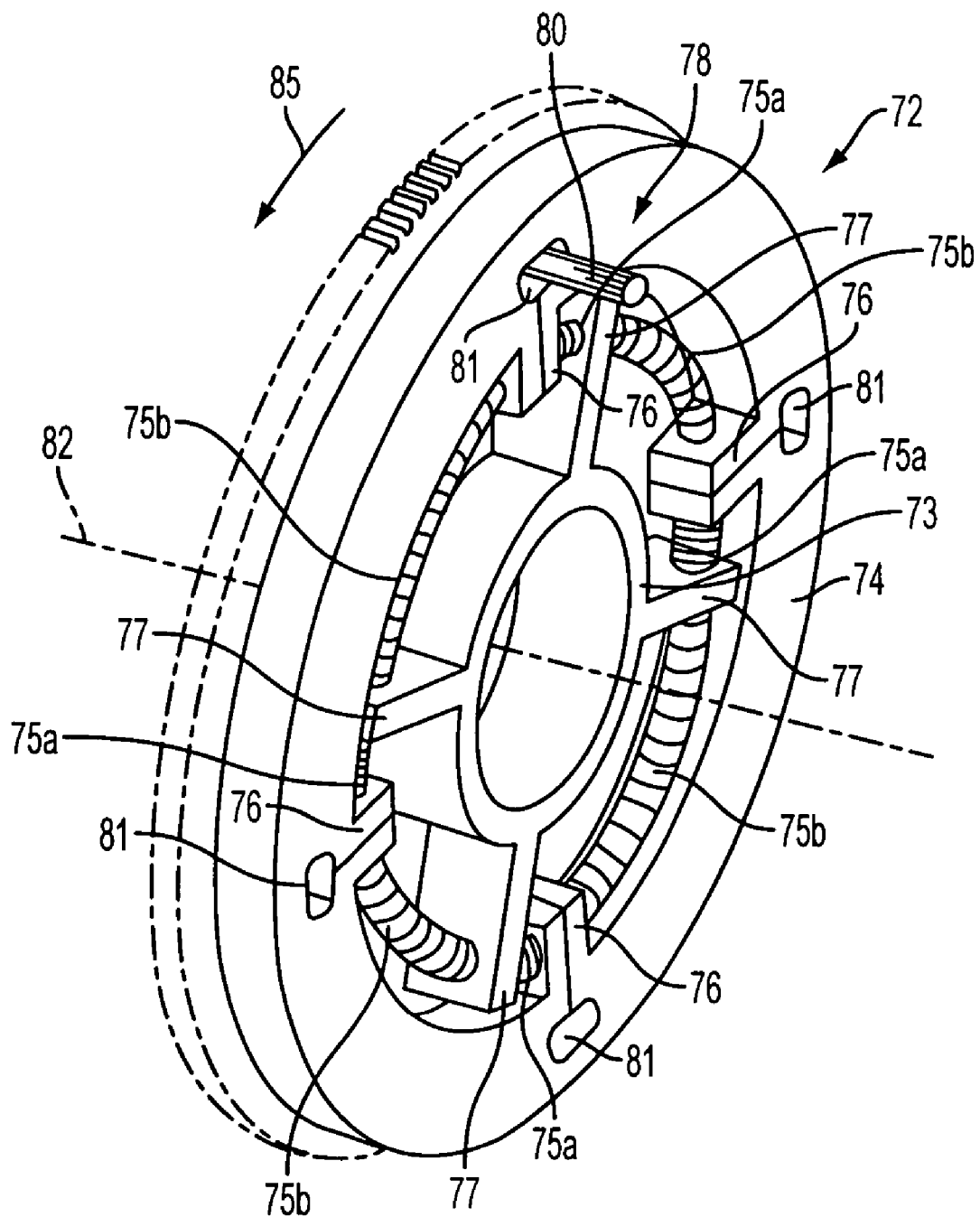
FIG. 15 is a perspective illustration of an alternative embodiment of a crankshaft and flywheel according to the present invention.
Figure 16:
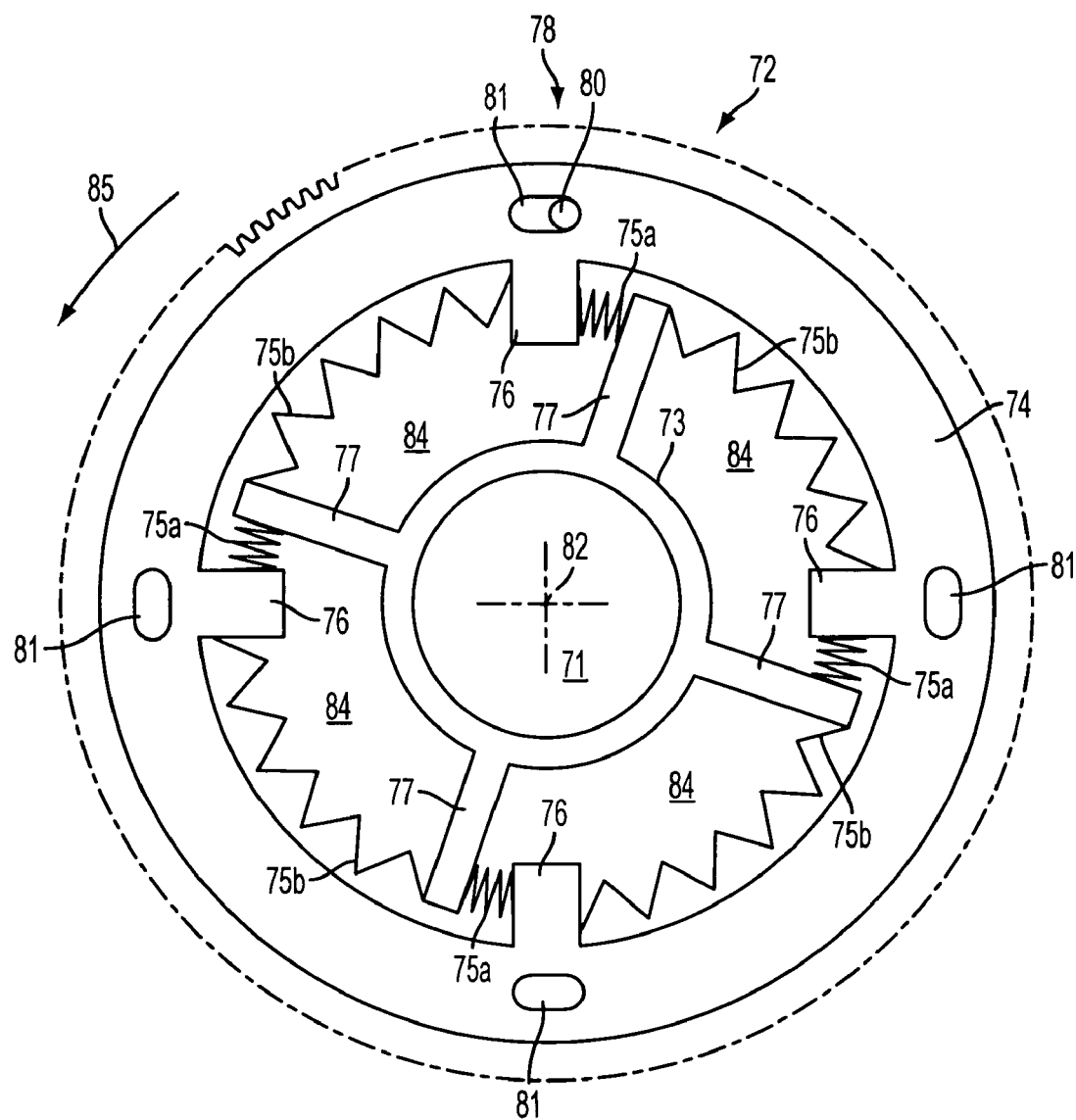
FIG. 16 is a schematic front view of the embodiment of FIG. 15.

FIGS. 15 and 16 are perspective and front views, respectively, illustrating another embodiment of an internal combustion engine according to the present invention. Crankshaft 71 is stationary and second flywheel segment 74 is secured by first engine-mounted locking device 78. In contrast to the embodiment illustrated in FIG. 14, first engine-mounted locking device 78 is implemented by a pin 80. To secure second flywheel segment 74, pin 80 is displaced axially and engaged with hole shaped cutouts 81 arranged in the second flywheel segment 74.

Flywheel 72 may be considered a passive adjustment device in which a non constant torque is exerted on the crankshaft after the normal operation of the internal combustion engine has ended, until the crankshaft comes to a standstill, preferably in the desired preferred position. Use of a flywheel according to the invention not only is advantageous in that the energy demand for activating the adjustment device is low, which is generally a characteristic of passive devices, but also in that the number of additional components and the amount of space required by the device are small. The small amount of space required promotes the actual goal of the designers of implementing packaging of the entire drive unit which is as effective, i.e. dense, as possible in the engine compartment of the motor vehicle. The small number of components which is necessary to form a flywheel according to the invention from a conventional two mass flywheel reduces both the manufacturing costs and the assembly costs.

According to the present invention, a component that is basically already present in the internal combustion engine, the flywheel, is used for controlled shutting down. It is not necessary to provide additional adjustment devices. In particular, there is no need to provide an active adjustment device, such as an electric motor to rotate the crankshaft into the desired position after the internal combustion engine has been shut down.

In a method for adjusting and/or restarting an internal combustion engine having a crankshaft and flywheel as illustrated in FIGS. 13-16, the second flywheel segment is secured in such a way that the kinetic energy which is emitted after the switching off of the internal combustion engine until it comes to a stationary state is reduced in a controlled fashion, due to the loading and unloading of the at least one spring element, such that the crankshaft is stopped in a desired position in which the at least one spring element is in a stable position. In this method variant, the second locking device is unnecessary. After the second flywheel segment has been secured to the engine by means of the first locking device, the first flywheel segment is decelerated to a standstill together with the crankshaft with loading of the at least one spring element. Without the second locking device, the spring element is not secured in the preloaded state and begins to accelerate the first flywheel segment together with the crankshaft in the opposite direction. After passing through the zero-load crossover point, the spring element is repeatedly decelerated and then accelerated creating an oscillating movement of the crankshaft during which time the kinetic energy of the drive train is slowly consumed by frictional losses and conversion into heat.

The final position of the crankshaft is reached when the at least one spring element assumes a stable position. When there is only one spring element, the stable position corresponds to the spring element being free of force, i.e. is not preloaded. When more than one spring element is used, the stable position is defined by the fact that the spring forces of the individual spring elements stay in equilibrium as previously described. Since the relative arrangement of the at least two flywheel segments in the stable position of the at least one spring element is known, and the position of the second flywheel segment can be influenced in the secured or locked state within the scope of the locking process, it is also possible with this method to adjust the stopping position of the crankshaft in a selective fashion. More complex considerations with respect to the determination of the kinetic energy which is present in the drive train and has to be reduced, as described above in connection with the use of a second locking device, are not necessary.

Another method according to the present invention includes starting from a stopped position in which the at least one spring element is in a stable position and in which the second flywheel segment is secured by means of the first locking devices. To start the engine, the second flywheel segment is released as a result of the releasing of the first locking device and the crankshaft is made to rotate. Since the at least one spring element cannot make available any energy for restarting, the crankshaft must be made to rotate in some other way. This can be done in a conventional way, i.e. using an electric motor or generator as a starter. However, in this case the invention is also advantageous in that stopping or moving the crankshaft to a preferred position during shut down is favorable for restarting. In particular, if the crankshaft is in a preferred position at the beginning of the restarting process, there is no ambiguity about the correct injection time and ignition time so that a run-in phase for synchronizing the engine operating parameters is not necessary, resulting in a faster and more efficient restart to save fuel.

As such, the present invention provides various systems and methods of constructing and operating an internal combustion engine to control positioning of the crankshaft during and after engine shut down to facilitate a restarting process which is distinguished in particular by low consumption of energy. Various embodiments of the invention transfer kinetic energy from the drive train to a rotating mass or a spring during shut down to decelerate the crankshaft and control crankshaft stopping position. The energy stored in a spring or rotating mass is then transferred back to the crankshaft to adjust its position to facilitate direct restarting, and/or to rotate the crankshaft during restarting of the engine.

While the best mode for carrying out the invention has been described in detail, those familiar with the art to which this invention relates will recognize various alternative designs and embodiments for practicing the invention as defined by the following claims.

What is claimed is:

1. An internal combustion engine comprising:
   a crankshaft;
   a mechanical energy storage device selectively coupleable to the crankshaft during engine shutdown to position the crankshaft so at least one piston of the internal combustion engine stops in a specific, favorable configuration corresponding to a specific angular range or angular position of the crankshaft desired for direct injection and restarting of the engine, wherein the mechanical energy storage device comprises a flywheel arranged on the crankshaft and the flywheel has a variable flywheel mass for the controlled shutting down and starting of the internal combustion engine.

2. The internal combustion engine of claim 1 wherein the flywheel has a flywheel mass that can be varied in an infinitely variable fashion.

3. The internal combustion engine of claim 1 wherein the flywheel is constructed in a modular fashion from at least two flywheel segments that can be connected to one another and detached from one another so that the flywheel mass can be varied at least in two stages.

4. The internal combustion engine of claim 3 wherein at least one flywheel segment is fixed to the crankshaft as a base segment.

5. The internal combustion engine of claim 3 wherein the at least two flywheel segments comprise disks that can be connected to one another and detached from one another by axial displacement in the direction of the longitudinal axis of the crankshaft.

6. A method for controlling stopping position of a crankshaft in an internal combustion engine having a mechanical energy storage device selectively coupleable to the crankshaft, the method comprising:
selectively coupling the mechanical energy storage device to the crankshaft during engine shutdown to position the crankshaft within a specific angular range favorable for direct injection restarting of the engine.

7. The method of claim 6 wherein the step of selectively coupling is performed after the ignition switch is switched off.

8. The method of claim 6 wherein the step of selectively coupling is performed after fuel supply to the cylinders is switched off.

9. The method of claim 6 wherein the mechanical energy storage device includes a flywheel having a variable mass arranged on the crankshaft and wherein the step of selectively coupling comprises:
changing the flywheel mass to vary a corresponding moment of inertia to control crankshaft deceleration and stopping position.

10. The method of claim 6 wherein the step of selectively coupling comprises selectively coupling the mechanical energy storage device to the crankshaft during engine shutdown to position the crankshaft so that so that at least one piston is in a position where a fuel injection and subsequent ignition of the air/fuel mixture lead to movement of the piston within the cylinder.

11. A method for controlled shut down of a multiple cylinder internal combustion engine having a crankshaft and a mechanical energy storage device, the method comprising:
transferring energy from the crankshaft to the mechanical energy storage device after the ignition and/or the fuel supply has been switched off to controllably decelerate the crankshaft to a stopping position advantageous for restarting the engine, wherein the mechanical energy storage device includes a flywheel having a variable mass arranged on the crankshaft and wherein transferring energy comprises changing the flywheel mass after the ignition and/or the fuel supply has been switched off to vary a corresponding moment of inertia to control crankshaft deceleration and stopping position.

12. A method for controlled shut down of a multiple cylinder internal combustion engine having a crankshaft and a mechanical energy storage device, the method comprising:
transferring energy from the crankshaft to the mechanical energy storage device after the ignition and/or the fuel supply has been switched off to controllably decelerate the crankshaft to a stopping position advantageous for restarting the engine, wherein the flywheel includes a base segment fixed for rotation with the crankshaft and at least one selectively coupleable segment, and wherein changing the flywheel mass comprises coupling the at least one segment for rotation with the crankshaft.

13. A method for controlled shut down of a multiple cylinder internal combustion engine having a crankshaft and a mechanical energy storage device, the method comprising:
transferring energy from the crankshaft to the mechanical energy storage device after the ignition and/or the fuel supply has been switched off to controllably decelerate the crankshaft to a stopping position advantageous for restarting the engine; wherein the flywheel includes a base segment fixed for rotation with the crankshaft and at least one selectively coupleable segment, and wherein changing the flywheel mass comprises coupling the at least one segment for rotation with the crankshaft;
wherein at least one flywheel segment is separated from the base segment before the crankshaft stops rotating; and
if the crankshaft does not stop in a preferred position, kinetic energy of the at least one separated flywheel segment is utilized to rotate the crankshaft into a preferred position by coupling the at least one segment to the base segment.

\* \* \* \* \*